United States Patent [19]
Zafiroglu

[11] 3,734,139
[45] May 22, 1973

[54] COMPOSITE THERMOPLASTIC STRUCTURE
[75] Inventor: Dimitri P. Zafiroglu, Wilmington, Del.
[73] Assignee: E. I. du Pont de Nemours and Company, Wilmington, Del.
[22] Filed: May 5, 1971
[21] Appl. No.: 140,547

Related U.S. Application Data

[60] Continuation-in-part of Ser. No. 820,028, May 21, 1968, abandoned, which is a division of Ser. No. 488,581, Sept. 20, 1965, Pat. No. 3,454,443.

[52] U.S. Cl.............138/146, 138/141, 138/DIG. 3, 161/139, 161/189
[51] Int. Cl.........F16l 9/12, B29c 27/20, B32b 31/26
[58] Field of Search..............................161/189, 139; 156/287, 294, 306; 138/146, 137, 141, 125, DIG. 3

[56] References Cited

UNITED STATES PATENTS

| | | | |
|---|---|---|---|
| 3,356,551 | 12/1967 | Glenn et al. | 161/189 X |
| 3,502,498 | 3/1970 | Petriello et al. | 161/189 X |
| 3,513,064 | 5/1970 | Westley | 161/189 X |
| 3,582,457 | 6/1971 | Barthel | 161/189 X |

Primary Examiner—Harold Ansher
Attorney—Wilkin E. Thomas, Jr.

[57] ABSTRACT

An article of manufacture comprising a substantially non-deformable cylinder of polytetrafluoroethylene and a substantially unperforated cylinder of a copolymer of tetrafluoroethylene and hexafluoropropylene uniformly bonded together to form an integral structure consisting entirely of the two polymers.

5 Claims, 5 Drawing Figures

COMPOSITE THERMOPLASTIC STRUCTURE

CROSS REFERENCE TO RELATED APPLICATIONS

This application is a continuation-in-part of application Ser. No. 820,028, filed on May 21, 1968 by the same inventor, now abandoned, which in turn is a division of application Ser. No. 488,581, filed on Sept. 20, 1965, also by the same inventor now U.S. Pat. No. 3,454,443.

BACKGROUND OF THE INVENTION

This invention relates to a composite thermoplastic structure. More specifically it relates to a composite polytetrafluoroethylene structure which can be readily bonded to other materials, especially other fluorinated plastics. More specifically still, it relates to a strong integral composite structure comprising a cylinder of a copolymer of tetrafluoroethylene and hexafluoropropylene bonded to a substantially non-deformable cylinder of polytetrafluoroethylene.

Polytetrafluoroethylene is a rigid fluorinated polymer which is useful in the manufacture of structural parts, especially those used in corrosive environments. The usefulness of the polymer would be increased, however, if it could be bonded to other materials. It is generally conceded, however, that it is impossible to bond polyeterafluoroethylene to other materials. Because of its non-stick properties, a bond utilizing any type of cement can be rejected out of hand. While it might seem possible, to those unfamiliar with the properties of polytetrafluoroethylene, that this polymer could be bonded to other thermoplastic materials by heat sealing the two together at a temperature at which the two will melt and flow together, experience has proved otherwise. Polytetrafluoroethylene has both a high melt temperature and a high melt viscosity. This means that it is barely thermoplastic; that it must be maintained at its melt temperature for an extremely long period of time before any bond, such as a heat seal, which is dependent on the flow of material can be formed.

It is an object of this invention to provide a structure, comprising polytetrafluoroethylene, which can be readily sealed to other materials.

SUMMARY OF THE INVENTION

This object was accomplished by forming a composite structure comprising a substantially non-deformable cylinder of polytetrafluoroethylene and a substantially impervious cylinder of a copolymer of tetrafluoroethylene and hexafluoropropylene uniformly bonded together to form an integral structure consisting entirely of polytetrafluoroethylene and the copolymer of tetrafluoroethylene and hexafluoropropylene. Because the melt temperature and melt viscosity of the copolymer of tetrafluoroethylene and hexafluoropropylene are lower than that of polytetrafluoroethylene, the composite structure described above can be more readily sealed to other structures, particularly those which are themselves made from the copolymer of tetrafluoroethylene and hexafluoropropylene.

Teflon Fluorocarbon Resin heat exchangers are an example of the usefulness of such structures. In these exchangers, the heat transfer element comprises a plurality of small flexible tubes made from a copolymer of tetrafluoroethylene and hexafluoropropylene. These tubes must be sealed, at their ends, into rigid headers which can in turn be used to connect the tubes into a fluid line. Headers made from polytetrafluoroethylene are an ideal choice, but until the present invention, no way way known to seal the tubes into the polytetrafluoroethylene header. I have found that, if the polytetrafluoroethylene is first coated with an unperforated cylinder of a material having a lower melt viscosity than the polytetrafluoroethylene, the tubes can easily be sealed into the structure so formed. I have also found that, contrary to the teaching of the prior art, there is at least one material, a copolymer of tetrafluoroethylene and hexafluoropropylene, that can be bonded to the polytetrafluoroethylene to form a strong integral structure.

It is not easy to make such a structure. The problem arises from the fact that the temperature at which the copolymer of tetrafluoroethylene and hexafluoropropylene degrades is close to the melt temperature of polytetrafluoroethylene, so that, when the copolymer is heated to the temperature required to melt the polytetrafluoroethylene for the time required to cause some flow of the polytetrafluoroethylene which is necessary for the heat seal to be effective, the copolymer of tetrafluoroethylene and hexafluoropropylene begins to degrade substantially. This degradation at best reduces the strength of the seal and usually prevents the formation of any seal at all. I have found, however, that this difficulty can be avoided by using the process described below. I have also found that if this process is followed, a structure can be formed in which the peel strength or seal strength of the bond between the polytetrafluoroethylene and the copolymer of tetrafluoroethylene and hexafluoropropylene is at least 3 lbs./in., and preferably is over 10 lbs./in. While structures having a bond strength less than this value may be useful for some applications, it is felt that this value sets a reasonable lower limit on the strength of the bond in structures that are generally useful where a strong bond is required between the polytetrafluoroethylene and the material to which it is to be ultimately bonded.

The product described above can be formed by using a process which is generally useful in sealing thermoplastic materials to other materials. Expressed broadly, the process comprises placing at least one layer of a thermoplastic material over the curved surface of a substantially cylindrical mandrel. This can be accomplished by wrapping the mandrel with the thermoplastic material. The inner layer of the thermoplastic material and the outer surface of the mandrel should not be adhereable to each other under the conditions of the process. Then the covered mandrel is placed within a cylinder of material maintained in a substantially non-deformable, rigid condition in snug contact with the cylinder, the interior surface of the cylinder and the outer layer of the thermoplastic material being adhereable at the softening temperature (usually the melting point) of the outer layer of the thermoplastic material. The mandrel is then heated at a rate such that the temperature at the interface of the thermoplastic material and the cylinder rises to a temperature above the softening temperature of the thermoplastic material but below the degradation temperature of the thermoplastic material. When this occurs, the temperature of the mandrel and the temperature of the cylinder are such that the mandrel has expanded more than the cylinder. These conditions are maintained for a period, usually at least 10 seconds, sufficient to adhere the materials at the interface. Finally the materials are cooled. The result is a structure in which the outer layer of the thermoplastic material is bonded to the interior surface of the cylinder.

To line a cylindrical sleeve of polytetrafluoroethylene with at least one layer of the copolymer of tetrafluoroethylene and hexafluoropropylene, a mandrel having a high thermal conductivity is used. A metal mandrel, e.g., of aluminum, brass, stainless steel or the like, is preferred. In operation, the mandrel is fitted with a cartridge heater and wrapped with at least one layer of the copolymer film. The wrapped mandrel is then placed snugly within the polytetrafluoroethylene sleeve. Since the coefficient of expansion of the metal mandrel is less than the coefficient of expansion of the polytetrafluoroethylene sleeve, it is necessary that the rate of heating of the mandrel is sufficiently rapid so that the polytetrafluoroethylene sleeve is kept at a temperature below that of the mandrel. Only in this way can the expansion of the mandrel be greater than the expansion of the sleeve. Furthermore, this rate of heating must be sufficient to raise the temperature of the outer layer of the film of the copolymer of tetrafluoroethylene and hexafluoropropylene above its melting point so that the pressure generated by the differential expansion of the mandrel and the sleeve can serve to bond the softened copolymeric layer of the interior surface of the polytetrafluoroethylene sleeve. Thereafter, the composite is cooled rapidly to provide the lined cylindrical sleeve.

It should be pointed out that where the cylindrical sleeve is thin, one-eighth inch or less, it is advantageous to employ an outer rigid retaining ring which is usually made of metal. Such a situation would also prevail where the "cylindrical sleeve" is a thin adherent coating on the interior surface of the external ring so that, in reality, a lined metal cylinder is produced. In this latter situation, the liner material is usually the same as the thin adherent coating material so that both materials tend to soften and fuse together.

To produce an article in which the outer surface of the polytetrafluoroethylene cylinder is coated with the copolymer of tetrafluoroethylene and hexafluoropropylene, the polytetrafluoroethylene cylinder is first inserted into a cylinder of the copolymer, and then the entire structure is in turn inserted into a metal restraining cylinder. Heat applied from the inside of the polytetrafluoroethylene cylinder is used to supply the differential pressure, and heat applied from the outside through the restraining cylinder is used to bring the interface up to the proper bonding temperature.

The invention will be more clearly understood by referring to the drawing and the examples which follow. In the drawing, FIG. 1 is a sectional view of one embodiment that employs the process of the invention;

EXAMPLES 1 – 7

Figure 1:
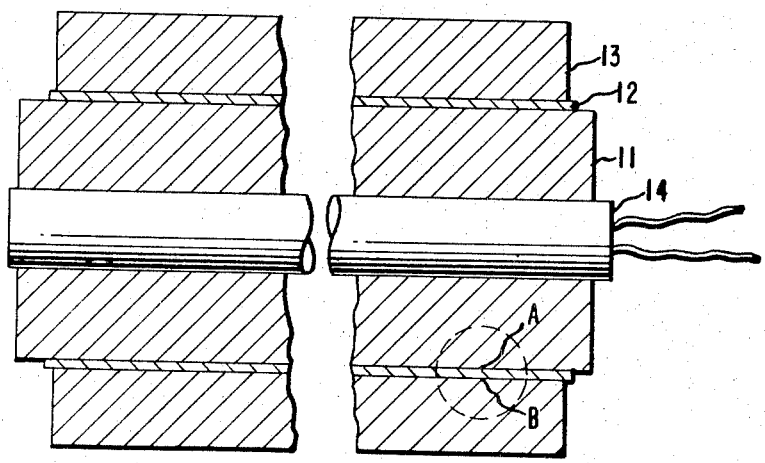

An aluminum mandrel 11 onto which three layers of a 5 mil Teflon FEP fluorocarbon film 12 (total thickness of 0.015 inch) has been wound is inserted into a cylindrical sleeve 13 of Teflon TFE fluorocarbon approximately 2 inches in inside diameter and having a ¼ inch wall thickness. The clearance between the rigid mandrel and the polytetrafluoroethylene sleeve is slightly less than the differential expansion to be developed subsequently. A cartridge heater 14 is placed in the central opening of the aluminum mandrel to provide the composite shown in FIG. 1.

Figure 2:
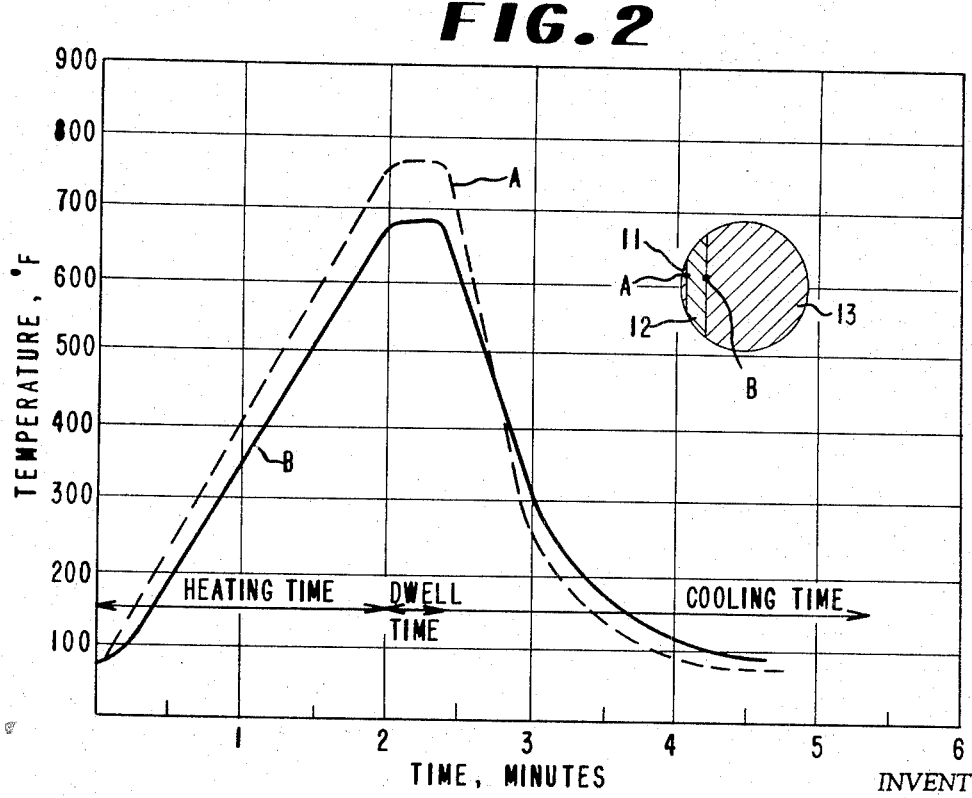
FIG. 2 is a typical cycle for lining a polytetrafluoroethylene sleeve with a copolymer of tetrafluoroethylene and hexafluoropropylene.
Figure 3:
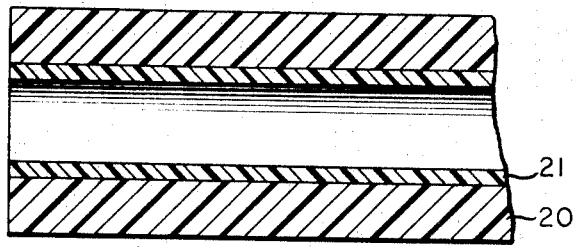
FIG. 3 is a cross-sectional view of a polytetrafluoroethylene cylinder lined with a copolymer of tetrafluoroethylene and hexafluoropropylene.
Figure 4:
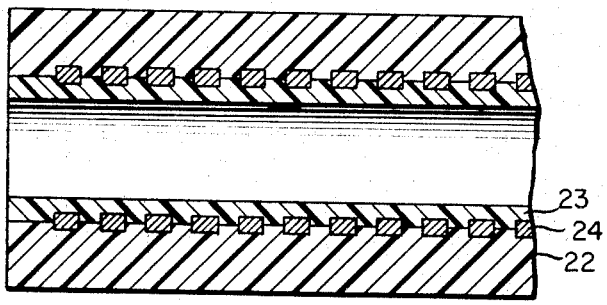
FIG. 4 is a cross-sectional view of a polytetrafluoroethylene cylinder lined with a copolymer of tetrafluoroethylene and hexafluoropropylene having a metal screen embedded therebetween.
Figure 5:
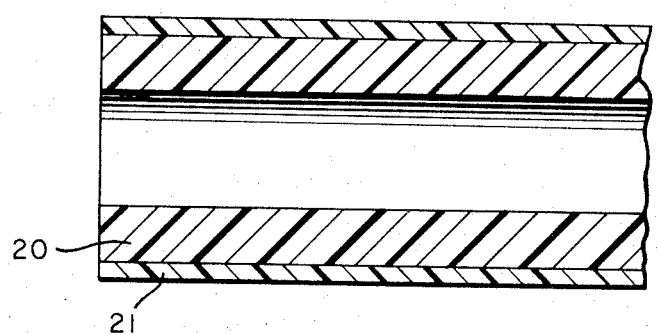
FIG. 5 is a cross-sectional view of a polytetrafluoroethylene cylinder having a coating of a copolymer of tetrafluoroethylene and hexafluoropropylene on its outer surface.

Current applied to the cartridge heater serves to raise the temperature of the mandrel. The temperature development at the two important interfaces, the interface A between the mandrel and the inner layer of the copolymeric film and the interface B between the outer layer of the copolymeric film and the interior surface of the sleeve, is shown in FIG. 2. Specifically, the temperature at the interface of the outer film layer and the interior surface of the sleeve reaches about 690° F. and the temperature of the other interface reaches about 735° F. within about 3 minutes. The degradation temperature of the copolymer is 760° F. At these conditions, the mandrel and the film layers thereon expanded about 17 mils while the polytetrafluoroethylene sleeve expands only 7 mils. The system is maintained at these conditions for about 25 seconds. Thereafter, the heater is removed from the mandrel and the assembly is chilled quickly by dipping it into cold water. After the mandrel is extracted, it is found that the film liner composed of the tetrafluoroethylene and hexafluoropropylene copolymer is bonded tightly to the interior surface of the polytetrafluoroethylene sleeve.

In an optional step, the lined sleeve may be subjected to a glazing cycle. This cycle serves to clean the liner surface and to improve the bonds that are obtained between the liner and the sleeve. Glazing may be accomplished by inserting the lined sleeve into a uniform temperature hot air over at 625° F. for a period of about 4 hours. After this period, the oven temperature is lowered to 575° F. where it is kept for a period of 36 hours. Thereafter, the oven is cooled to room temperature within about 6 hours. As mentioned previously, this cycle serves to improve the adhesive bonds and to clean the surface by burning away all residues and dirt therefrom.

In Examples 2 – 7, the general procedure of Example 1 is repeated except that the mandrel diameter, thermoplastic material thickness, outer sleeve wall thickness, wrapped mandrel to outer sleeve clearance and heating rate are so regulated to obtain the ranges of interface temperatures, ($T_i$), dwell times (R), and pressures at the interface of the outer layer of the liner and the interior surface of the sleeve (P), useful in obtaining acceptable seal strengths (F) listed below. In all these examples, the seal strengths after the glazing step ($F_g$) is also obtained. The results for the seven examples are presented in Table I.

TABLE I

| Example | $T_i$ °F. | R seconds | P psi | F lb./in. | $F_g$ lb./in. |
| --- | --- | --- | --- | --- | --- |

| | | | | | |
|---|---|---|---|---|---|
| 1 | 690 | 25 | 20 | 3-6 | 10-15 |
| 2 | 700 | 25 | 2 | 8-10 | 15-20 |
| 3 | 700 | 120 | 2 | 15-20 | 25-30 |
| 4 | 710 | 60 | 50 | 10-15 | — |
| 5 | 710 | 120 | 2 | 18-20 | 25-30 |
| 6 | 710 | 120 | 50 | 18-20 | 25-40 |
| 7 | 730 | 120 | 50 | 10-15 | 25-35 |

EXAMPLES 8 and 9

In Example 8, the procedure of Example 1 was followed substantially using a ⅛ inch thick polytetrafluoroethylene cylinder. Three layers of the 5 mil thick film of the tetrafluoroethylene hexafluoropropylene copolymer an an aluminum mandrel. After a heat-up time of only 1 minute, the temperature of the interface between the outer layer of the copolymeric film and the interior surface of the polytetrafluoroethylene cylinder is 710° F. The pressure developed at the interface is 50 psi. After maintaining these conditions for 60 seconds, and subsequently cooling the composite, a lined polytetrafluoroethylene cylinder is obtained. The seal strength at the interface is 10 – 15 lbs./in. However, it is noted that the film of the tetrafluoroethylene-hexafluoropropylene copolymer has been somewhat degraded indicating that the cycle has probably been too rapid.

In a control, a heat-up time of 10 minutes is used to bring the temperature of the interface between the outer layer of the liner and the interior surface of the cylinder to 710° F. However, this slow cycle permits the relatively thin outer sleeve to heat up and expand more than the mandrel. Consequently, pressure is lost and no bond is made. It is concluded that for this wall thickness of one-eighth inch, the heat-up time should be close to 1 minute to produce a bond. However, as shown previously, this is impractical since degradation is induced.

In Example 9, a stainless steel retaining ring is placed over the ⅛ inch thick polytetrafluoroethylene cylinder. In all other respects, the conditions are the same as the above-recited control. A heat-up time of 10 minutes is used to bring the temperature at the interface between the outer layer of the copolymeric film liner and the interior surface of the polytetrafluoroethylene cylinder to 710° F. The conditions are maintained for 120 seconds and the pressure developed is 50 psi. After quenching, the copolymer film is bonded securely to the interior surface of the polytetrafluoroethylene cylinder, the seal strength at the interface being 10 – 15 lb./in. Hence, it is concluded that a retaining ring makes the system less sensitive to the heating cycle.

EXAMPLE 10

The general procedure of Example 1 is repeated using a stainless steel sleeve whose interior surface has been precoated with a thin coating of a copolymer of tetrafluoroethylene and hexafluoropropylene using conventional spraying and baking techniques. An aluminum mandrel wrapped with three layers of a 5 mil film of the copolymer of tetrafluoroethylene and hexafluoropropylene is placed within the sleeve. The interface between the film coating and the outer layer of the copolymeric film wrap is heated to 560° F. where it is maintained for a period of 60 seconds. The differential expansion between the aluminum mandrel and the stainless steel sleeve causes a pressure of 1 – 2 psi. After cooling, the copolymeric film is bonded securely to the coating on the stainless steel sleeve.

Since stainless steel expands less than aluminum at 560° F., it is possible to run this process without the interior cartridge heater. Instead, the composite may be placed in an oven at a temperature of 560° F. to provide substantially the same result. It is also possible to use a polytetrafluoroethylene mandrel instead of aluminum and heat the composite externally as in a furnace. Although, in this latter situation the mandrel may heat less than the outer stainless steel sleeve, the mandrel expands more than the sleeve to provide the desired pressure.

EXAMPLE 11

Two layers of a 5 mil thick film of tetrafluoroethylene-hexafluoropropylene copolymer are wound on a polytetrafluoroethylene mandrel. The composite is inserted into a stainless steel sleeve adapted for heating. By heating the sleeve slowly to about 700° F., the polytetrafluoroethylene mandrel is found to reach about 350° F. at its internal surface and 700° F. at its external surface causing an expansion of about 2 percent compared to an expansion of the sleeve of only about 1 percent. A heat-up time of 3 minutes and a dwell time of 120 seconds are employed. The pressure developed is 50 psi. After cooling, it is found that the copolymer film is adhered firmly to the outer surface of the polytetrafluoroethylene mandrel, the seal strength being 10 – 15 lb./in.

What is claimed is:

1. An article of manufacture comprising a substantially non-deformable cylinder of polytetrafluoroethylene and a substantially unperforated cylinder of a copolymer of tetrafluoroethylene and hexafluoropropylene uniformly bonded together to form an integral structure consisting entirely of polytetrafluoroethylene and the copolymer of tetrafluoroethylene and hexafluoropropylene.

2. The article of claim 1 wherein the bond strength at the interface between the two polymers is at least 10 lbs/in.

3. The article of claim 2 wherein said cylinder of a copolymer of tetrafluoroethylene and hexafluoropropylene is bonded to the interior surface of said cylinder of polytetrafluoroethylene.

4. The article of claim 2 wherein said cylinder of tetrafluoroethylene and hexafluoropropylene is bonded to the exterior surface of said cylinder of polytetrafluoroethylene.

5. The article of claim 1 wherein the bond strength at the interface between the two polymers is at least 3 lbs/in.

* * * * *